United States Patent [19]
Rambauske

[11] 3,805,051
[45] Apr. 16, 1974

[54] CATOPTRIC LENS ARRANGEMENT

[75] Inventor: Werner R. Rambauske, Carlisle, Mass.

[73] Assignee: Raytheon Company, Lexington, Mass.

[22] Filed: July 2, 1973

[21] Appl. No.: 376,016

[52] U.S. Cl.... 240/41.35 A, 240/51.12, 240/103 R, 350/294, 350/299
[51] Int. Cl.......................... F21v 71/14, G02b 5/10
[58] Field of Search........ 240/41 R, 41.37, 41.35 A, 240/41.35 C, 51.12, 103 R; 350/293, 294, 299

[56] References Cited
UNITED STATES PATENTS

| | | | |
|---|---|---|---|
| 3,038,372 | 6/1962 | Lessman | 240/41.35 R X |
| 3,075,064 | 1/1963 | Bondonio | 240/51.12 X |
| 1,679,108 | 7/1928 | Wood | 240/41.37 |
| 2,198,014 | 4/1940 | Ott | 350/293 X |
| 1,577,352 | 3/1926 | Coughlan | 240/41.37 |
| 3,453,425 | 7/1969 | Whitaker | 240/41.35 R X |
| 657,693 | 9/1900 | Egnell | 350/294 |
| 2,846,565 | 8/1958 | Binkley et al. | 240/41.35 R X |

Primary Examiner—Joseph F. Peters, Jr.
Attorney, Agent, or Firm—Philip J. McFarland; Joseph D. Pannone

[57] ABSTRACT

An improved catoptric lens arrangement for forming a composite beam of wave propagated energy emanating from more than one source is shown; in the preferred embodiment each one of two ring sources of light disposed around an axis of symmetry illuminates a different one of a pair of confocal mirrors in a manner that light reflected from such mirrors becomes incident on a beam forming mirror confocal with the pair of confocal mirrors to form a desired composite beam.

3 Claims, 3 Drawing Figures

CATOPTRIC LENS ARRANGEMENT

BACKGROUND OF THE INVENTION

This invention pertains generally to catoptric lens arrangements and particularly to arrangements of such nature adapted to compensate for achromatic aberrations, or the effects thereof.

It is well known in the art that the finite dimensions of any practical light source, when used with a catoptric lens arrangement to form a beam of light, give rise to various kinds of achromatic aberrations. That is, at least some of the reflected rays from any point on a mirror in such an arrangement lie in a different direction from the direction elementary ray theory would predict. In particular, if a beam forming catoptric lens arrangement incorporating curved mirrors having a circular cross-sections is used, the finite dimensions of the associated light source give rise to aberrations of the type generally known as spherical aberration and coma. The particular kind of aberration, as is known, depends upon the location of the light source relative to the focal point, or points, of the mirrors in a beam forming arrangement. Thus, a source spaced from the focal point and on the axis of symmetry of a curved mirror, or lens axis, gives rise to spherical aberration; a source spaced from the focal point and the lens axis gives rise to coma. With mirrors having circular cross-sections, as those generated by rotating a portion of a quadratic conic section about an axis of symmetry, the magnitude of former aberration is, at any given cross-section, constant; at any given cross-section the magnitude of the latter varies from zero to a maximum dependent upon several known factors, including the dimensions of the source.

It is common practice in the art to reduce both spherical aberration and coma by providing a light source whose dimensions are as small as possible. Thus, it is known to use different types of arc lamps, in combination in some applications with an apertured plate, to simulate a point light source. With such an arrangement, the simulated source may be located almost exactly at a focal point of the entrance mirror. It is also common practice to reduce spherical aberration and coma by increasing the distance from a finite source to the reflection point on the entrance mirror. The greatest angle between a ray from the source and the line from the focal point to the reflection point is, as a result, as small as possible. The aberration in the reflected ray is, consequently, a minimum. It is also common practice to pass a partially collimated beam containing aberrant rays through a number of plates or light baffles, thereby eliminating or redirecting the aberrant rays. Still another approach is to pass a partially collimated beam through a refractive lens to redirect aberrant rays to a desired direction.

While known approaches to compensation for achromatic aberrations are, in many applications, satisfactory, in some important cases sufficient compensation is almost impossible to attain; for example, in the design of an ordinary headlamp for automobiles.

The problem of reducing aberrations to an acceptable level in an automobile headlamp is complicated by the requirement that a single source and catoptric lens arrangement must provide different kinds of lighting. That is, although one function of the headlamp is to provide a well-collimated beam to illuminate the roadway ahead of the automobile, light must also be provided to illuminate areas on either side of the roadway. At the same time, however, it is essential that stray, or misdirected, light be reduced to a minimum to prevent glare in the eye of a motorist in an approaching vehicle or, by reason of reflection from the rear view mirror in a vehicle traveling in the same direction, glare in the eye of the motorist in a vehicle ahead.

Unfortunately, with automobile headlamps now used, the various conflicting requirements may not be met simultaneously. As a result, it is necessary to provide so-called "high∞ and "low" headlamps to permit the operator of an automobile selectively to change the beam according to driving conditions. As every motorist knows, such control, if left to a careless operator, often means that approaching motorists are blinded. Such a problem will become even more acute in the future if, as is now contemplated, a third headlamp is installed in an automobile to form a beam for illuminating the roadway at relatively longer distances than possible with presently used "high" beams. Another problem is that, for each headlamp, only a single incandescent filament may conveniently be used. Obviously, if such a filament burns out, the headlamp is utterly useless. It has been proposed that the beam of an automobile headlamp be steerable with respect to the automobile on which it is mounted. To accomplish such an end, without degradation of the beam, the relative positions of the light source and mirror in a conventional headlamp must be maintained constant.

The basic reason for the foregoing and other problems of known automobile headlamps is that, with a conventional paraboloidal mirror illuminated by an incandescent source of finite dimensions, spherical aberration and coma become appreciable, preventing formation of a beam of desired shape. To reduce the effects of such aberrations so that the beam may be shaped as required, light reflected from the paraboloidal mirror and light emanating directly from the incandescent source are passed through a complex refractive lens. Because the apparent origin of the light reflected from the paraboloidal mirror is not the same as the actual source, it is apparent that the elements of the complex refractive lens cannot be perfectly shaped or positioned to direct both the reflected and unreflected light. It follows, therefore, that "trade-offs" in the design of the elements of the complex refractive lens are necessary to reduce the aberration of the finally produced beam to an acceptable level. Even so, however, it is necessary to maintain the relative positions of the incandescent filament, the paraboloidal mirror and the complex refractive lens within close limits by assembling those elements into a unitary structure as the familiar "sealed-beam." Such an assembly must be replaced in toto if the incandescent filament burns out and, further, militates against steering the beam as the automobile is operated.

SUMMARY OF THE INVENTION

Therefore, it is a primary object of this invention to provide an improved beam forming catoptric lens arrangement operative with a light source of finite dimensions to provide a beam of light which may be shaped as desired.

Another object of this invention is to provide an improved beam forming catoptric lens arrangement operative with any, or all of a plurality of light sources of finite dimensions to provide a beam of light which may be shaped as desired.

Another object of this invention is to provide an improved beam forming catoptric lens arrangement operative with any, or all, of a plurality of light sources of finite dimensions to provide a beam of light which may be collimated to any desired degree by reducing spherical aberration and coma.

Still another object of this invention is to provide an improved catoptric lens arrangement operative with any selected number of light sources whose intensity may be controlled as desired to change the luminous flux density of the light in a single beam, or a number of beams.

Still another object of this invention is to provide an improved catoptric lens arrangement adapted to produce, from the light emanating from one or more extended light sources, a composite beam of light, the shape of such beam being adjustable as desired.

These and other objects of this invention are attained generally by providing, in combination, at least one light source having finite dimensions and a catoptric lens arrangement, the latter including at least a pair of confocal mirrors, each having a reflecting surface with an infinite number of image or focal points on a line spaced from an axis of symmetry of the catoptric lens arrangement; each such mirror sometimes being referred to hereinafter as a "Rambauske" mirror, thereby differing from a conventional mirror which has one, or two, image or focal points on an axis of symmetry.

BRIEF DESCRIPTION OF THE DRAWINGS

For a more complete understanding of this invention, reference is now made to the following detailed description of a preferred embodiment illustrated in the accompanying drawings, wherein.

DESCRIPTION OF THE PREFERRED EMBODIMENT

Figure 1:
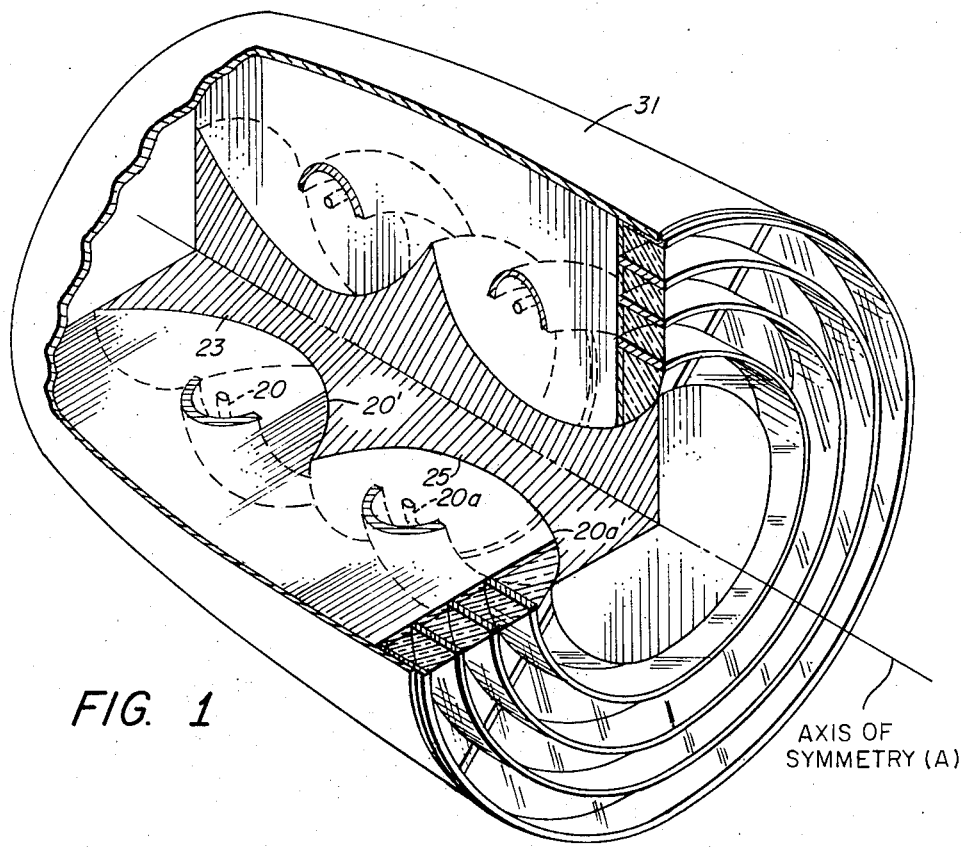
FIG. 1 is an isometric view, partially cut away, of beam forming apparatus according to this invention for combining light from two separate ring sources into a composite beam.
Figure 1A:
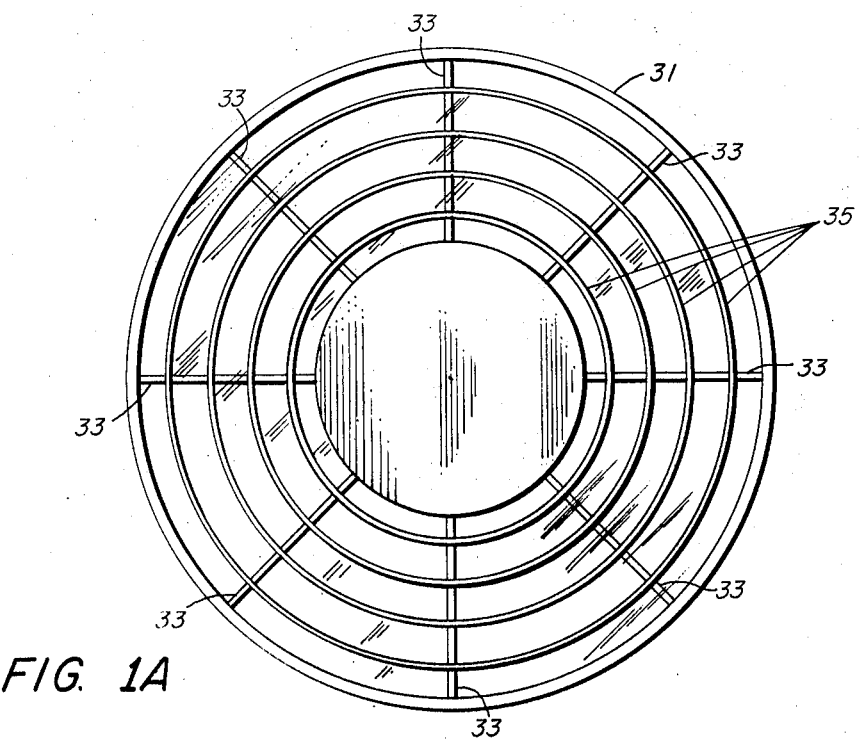
FIG. 1A is an end view of the arrangement shown in FIG. 1.

Referring now to FIGS. 1 and 1A together it may be seen that two separate ring sources 20, 20a (as a pair of fluorescent lamps) may be arranged to illuminate a single beam forming mirror 31. Thus, the ring source 20 is coincident with a focal circle generated by rotating a part of one branch of a hyperbola 20' about an axis of symmetry, A. Ring source 20a is coincident with a focal circle generated by rotating a part of one branch of a hyperbola 20a' about the same axis of symmetry A.

Figure 2:
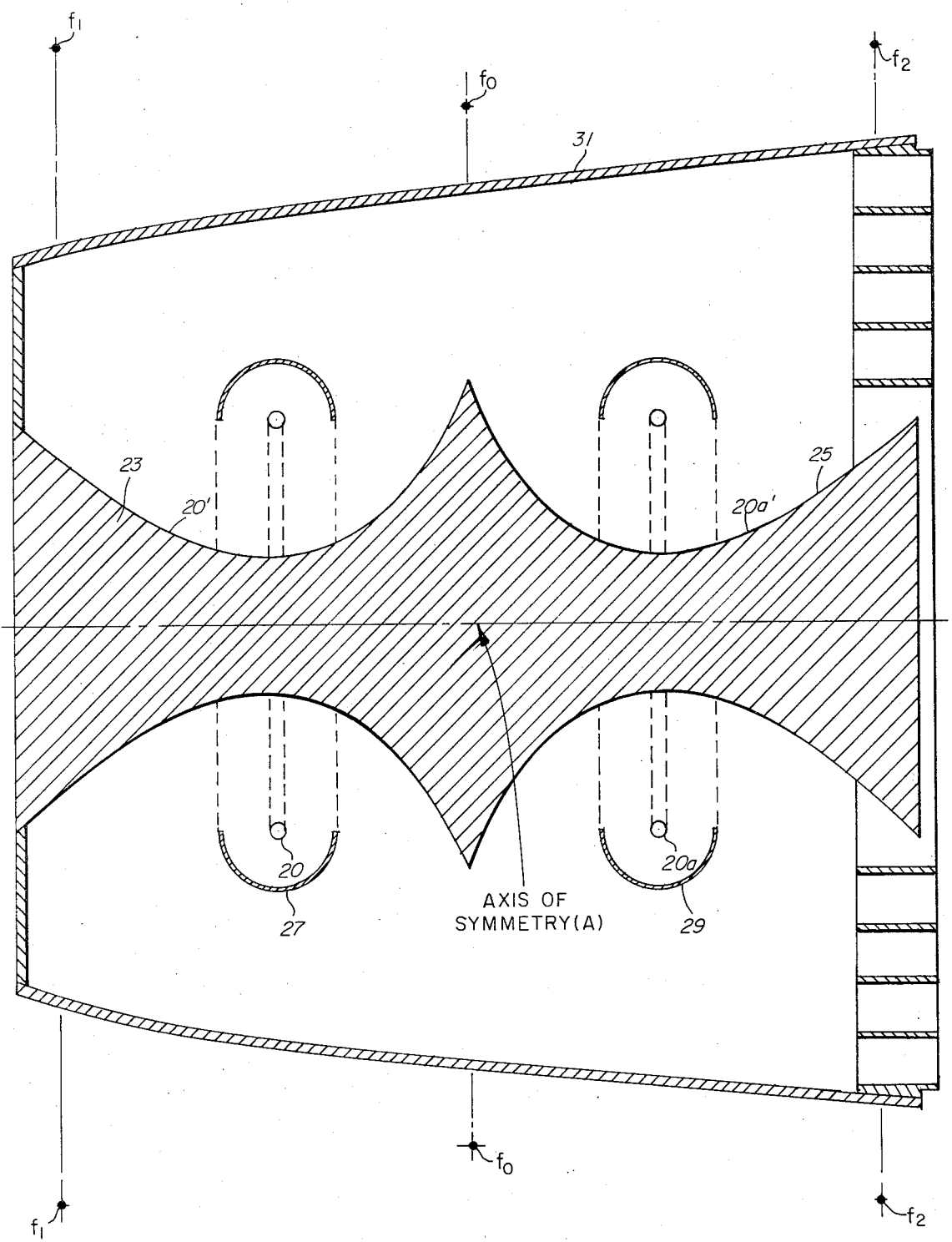
FIG. 2 is a cross-sectional view of the arrangement shown in FIG. 1.

The two hyperbolas (FIG. 2) share a common focal point, $f_o$. Therefore, rotation of the selected parts of the hyperbolas 20', 20a' causes the common focal point, $f_o$, to trace a common circle around the axis of symmetry A and the conjugate focal points of each hyperbola ($f_1$ and $f_2$) to trace separate circles about the axis of symmetry. The selected parts of the pair of hyperbolas, when rotated, correspond to the reflecting surfaces of mirrors 23, 25. One-half of a circular toric mirror 27 is concentric with ring source 20 and one-half of a circular toric mirror 29 is concentric with ring source 20a. A beam forming mirror 31, here having a reflecting surface corresponding to the surface generated by rotating a part of a parabola having its focal point at $f_o$ and its axis of symmetry (not shown) parallel to the axis of symmetry A redirects all light reflected from the mirrors 23, 25 to form an emergent beam. A number of radial baffles 33 (FIG. 1A) and a number of concentric circular baffles 35 complete the assembly.

It will be recognized that, in any meridional plane as shown in FIG. 1A, light from any point on either ring source 20, 20a and not falling on any one of the radial baffles 33 will be reflected from mirrors 23, 25 as though it had originated at a point on the focal circle $f_o - f_o'$. Thus, the reflected light in any meridional plane, except that falling on the end of any one of the radial baffles 33, will be reflected by the beam forming mirror 31. The rays in any meridional plane reflected by the beam forming mirror 31 are here (because such mirror is paraboloidal in shape and confocal with the apparent origin of the rays incident thereon) substantially parallel to the axis of symmetry A. Therefore, except for the few rays falling on the ends of the concentric circular baffles 35, such rays form a hollow substantially collimated beam around the axis of symmetry A.

Nonmeridional rays, meaning rays not in a meridional plane of either mirror 23 or mirror 25, respectively, from either ring source 20 or ring source 20a are not parallel to the radial baffles 33. Depending on the spacing of the radial baffles 33 and the orientation, with respect to such baffles, of the plane in which such rays lie, a greater or lesser number of the non-meridional rays will impinge on the sides of the radial baffles 33 before or after reflection from the mirrors 23, 25 or the beam forming mirror 31. With the radial baffles nonreflective, meaning that such baffles have a black matte finish, those nonmeridional rays in planes greatly differing from the meridional planes are absorbed by the radial baffles 31. The nonmeridional rays finally reflected from the beam forming mirror 31, therefore, appear to have originated at points near the focal circle of such mirror. That is, the less "aberrant" rays are the only nonmeridional rays passing between the radial baffles 33. The concentric circular baffles 35, depending upon their spacing and position along the axis of symmetry, then will intercept the most aberrant of the rays permitted to pass between the radial baffles 33. In this connection, it should be noted that the position of the beam forming mirror 31 along the axis of symmetry may be adjusted as desired to change the direction of aberrant rays passing between the concentric circular baffles 35 from "toward" the axis of symmetry A to "away" from such axis. The spacing and reflectivity of various parts of the baffles 35 may, therefore, be changed to adjust the direction and amount of aberrant rays in the emergent beam. For example, if the disclosed beam forming arrangement is to be used as an automobile headlamp it would be desirable to reduce aberrant rays which could blind another motorist to a minimum. Thus, assuming the aberrant rays are all "away" from the axis and the arrangement is viewed from an approaching automobile, aberrant rays in all quadrants (except the upper right hand quadrant) are directed away from the eye of an approaching motorist. Only aberrant rays in the upper right hand quadrant may reach the eye of such a motorist. To reduce the aberrant rays which could cause difficulty to a minimum, the spacing of the circular concentric baffles 35 in the upper right hand quadrant may be reduced, i.e., more baffles may be used. Further, the depth of each baffle could be increased. With respect to the problem of blinding, by reflection from a rear-view mirror, a motorist in an automobile proceeding in the same direction, only aberrant rays from a small sector in the upper half on either side of the vertical could possibly affect such a motorist. To eliminate the problem, a greater number of circular concentric baffles 35 would be used in the sector of interest. On the other hand, if it is desired to increase illumination in other directions, as to provide lighting of the side of a roadway, the number of circular concentric baffles 35 may be reduced, or such baffles may be eliminated in appropriate sectors. Alternatively, sectors of at least the bottom sides of the circular concentric baffles 35 could be made reflective. It is felt from the foregoing that this invention should not be restricted to its disclosed embodiment but rather should be limited only by the spirit and scope of the appended claims.

I claim:

1. A catoptric lens arrangement for forming a composite beam of wave propagated energy from a plurality of different ring sources spaced along an axis of symmetry, such arrangement comprising:

a. a different concave primary mirror symmetrically disposed around the axis of symmetry, each such mirror being nearer to such axis than the corresponding ring source, the cross-sectional shape of each such mirror being that of a segment of a different hyperbola rotated around the axis of symmetry, one focal point of each hyperbola tracing a single circle in a plane orthogonal to such axis; and
  b. a common concave secondary mirror symmetrically disposed around the axis of symmetry, the cross-sectional shape of such secondary mirror being that of a segment of a parabola rotated about the axis of symmetry, the principal axis of such parabola being parallel to the axis of symmetry and the focal point of such parabola tracing a circle coincident with the single circle.

2. A catoptric lens arrangement as in claim 1 having, additionally: A plurality of radial baffles radially disposed about the axis of symmetry between each different concave primary mirror and the common concave secondary mirror.

3. A catoptric lens arrangement as in claim 2, having, additionally: A plurality of concentric baffles centered on the axis of symmetry, such concentric baffles being disposed in the path of wave propagated energy reflected from the common concave secondary mirror.

* * * * *